(No Model.)

J. W. RODGER & R. J. MATHESON.
MACHINE FOR WINDING AND UNWINDING WIRE.

No. 386,415. Patented July 17, 1888.

Witnesses:
M. P. Smith
R. H. Orwig

Inventors:
John W. Rodger and Robert J. Matheson,
By Thomas G. Orwig, Attorney.

United States Patent Office.

JOHN WILLIAM RODGER AND ROBERT JAMES MATHESON, OF BERLIN, IOWA.

MACHINE FOR WINDING AND UNWINDING WIRE.

SPECIFICATION forming part of Letters Patent No. 386,415, dated July 17, 1888.

Application filed January 3, 1888. Serial No. 259,686. (No model.)

*To all whom it may concern:*

Be it known that we, JOHN WILLIAM RODGER and ROBERT JAMES MATHESON, citizens of the United States of America, and residents of Berlin, in the county of Tama and State of Iowa, have invented a Machine for Winding and Unwinding Wire, of which the following is a specification.

Our object is to save time in laying down, stretching, and taking up wire as required to produce straight parallel corn-rows in a field, or in making or removing wire fences.

Our invention consists in the construction of a portable machine adapted to be attached to a corn-planter and automatically operated in concert with a planter, as hereinafter set forth, pointed out in our claim, and illustrated in the accompanying drawings, in which—

Figure 1:
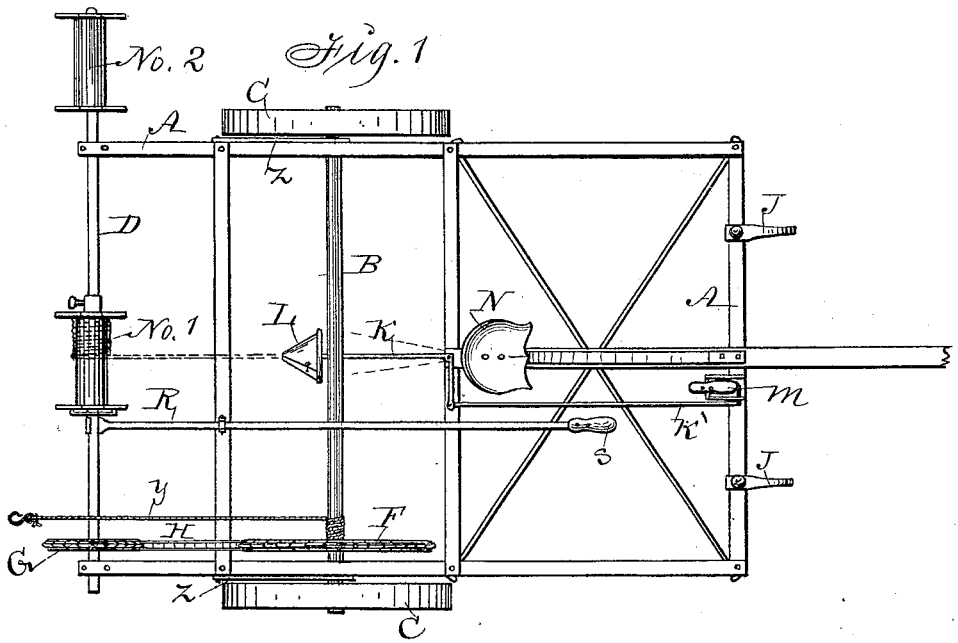
Figure 2:
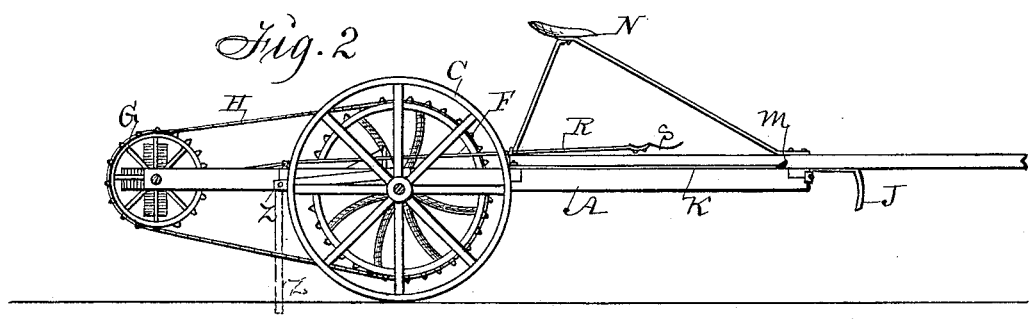
Figure 3:
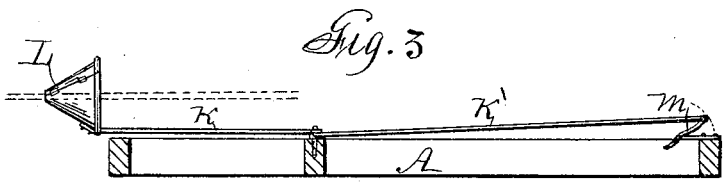

Figure 1 is a top view, and Fig. 2 a side view, showing our machine adapted to be attached to a planter as required for practical use. Fig. 3 is an enlarged sectional view showing the construction and application of our wire-guide.

A represents the carriage-frame of our machine. It is about three feet wide and five feet long, and rigidly fixed upon a truck composed of an axle, B, and two wheels, C, as shown.

D is a revolving shaft mounted in bearings formed in or fixed to the rear end of the frame A.

No. 1 is a spool attached to the center of the shaft and adapted for winding and unwinding a knotted wire to facilitate laying and stretching it across a field, and also for taking up the same wire as a planter and machine are jointly advanced over the ground.

No. 2 is a spool or reel attached to the end of the shaft in such a manner that it is adapted to unwind and stretch a fence-wire along a line of posts as the machine is advanced, and as required to facilitate making a wire fence.

F is a sprocket-wheel fixed on the axle B, and connected with a smaller sprocket-wheel, G, fixed to the shaft D, by means of a drive-chain, H, in such a manner that when the machine is advanced over the ground the shaft and spools will be automatically operated, as required to wind and unwind wire for the purposes stated.

J are hooks fixed to the front end of the carriage-frame to adapt our machine to be readily attached to the carriage of a corn-planter.

K is an elbow-shaped lever pivoted to the cross-piece of the frame A.

L is an open-ended and cone-shaped wire-guide fixed to the rear end of the lever. The guide is made of sheet metal and has a hinged section that allows it to be opened and closed to admit and retain a wire that is to be passed through, and thereby directed relative to the reel No. 1, upon which it is to be wound.

*m* represents a treadle pivoted to the carriage-frame and connected with the end of the lever by means of a rod, *k'*, in such a manner that the driver on the seat N can, by means of his foot, operate the treadle and lever to thereby move the guide L to and fro laterally, as required, to direct the wire therein, so that it will be wound in successive coils from one end of the spool to the other.

R is a lever pivoted to the rear cross-piece of the frame A. Its rear end is flattened and bent around the shaft D, and its front end provided with a foot-rest, *s*, in such a manner that the driver on the seat can by foot-pressure apply friction to the rotating shaft, and thereby regulate the speed of the shaft, as required, to stretch a wire that is connected with one of the spools on the shaft.

*y* is a rope fixed to the axle B and provided with a hook on its end. *z z* are props pivoted to the side pieces of the frame A, so that they can be let down to elevate the frame and allow the wheels and axle to be rotated to wind up the rope, and thereby stretch a wire fastened to the hook on the end of the rope.

We are aware a wire-guiding device has been combined with a reel and a corn-planter in such a manner that the wire-guide could be adjusted relative to a spool on the reel by means of the horizontal motions of a hand-lever. We are also aware that a machine has been made for gathering and distributing wire; but our manner of arranging and combining wire-guiding mechanism and wire-reeling mechanism with a truck or carriage, so that the wire-guiding device can be operated in concert with the reeling mechanism and governed by means of a treadle within reach of the driver when seated on the machine, is novel and greatly advantageous.

We claim as our invention—

A two-wheeled truck or carriage having a rotating shaft and spool-carrier in rear of and parallel with the carriage-axle, driving mechanism for transmitting motion from the carriage-axle to said rotating shaft, and the guide L, treadle $m$, lever $k$, and rod $k'$, arranged and combined substantially as shown and described, to operate in the manner set forth, for the purposes stated.

JOHN WILLIAM RODGER.
ROBERT JAMES MATHESON.

Witnesses:
 JOHN MURRAY,
 DAN MATHESON.